(12) United States Patent
Lim et al.

(10) Patent No.: US 12,290,874 B2
(45) Date of Patent: May 6, 2025

(54) LASER ANNEALING DEVICE

(71) Applicant: Samsung Display Co., Ltd., Yongin-Si (KR)

(72) Inventors: Dong Eon Lim, Cheonan-si (KR); Sung Yong Kang, Asan-si (KR); Youngsik Kim, Cheonan-si (KR); Jisoo Kim, Goyang-si (KR); Hyunjin Kim, Ansan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 1066 days.

(21) Appl. No.: 16/810,152

(22) Filed: Mar. 5, 2020

(65) Prior Publication Data
US 2020/0384570 A1 Dec. 10, 2020

(30) Foreign Application Priority Data

Jun. 10, 2019 (KR) ........................ 10-2019-0068022

(51) Int. Cl.
H01L 21/02 (2006.01)
B23K 26/00 (2014.01)
(Continued)

(52) U.S. Cl.
CPC .......... B23K 26/009 (2013.01); G02B 27/106 (2013.01); G02B 27/144 (2013.01); G02B 27/145 (2013.01)

(58) Field of Classification Search
CPC .......... H01L 21/02; B23K 26/00; G02B 27/28
See application file for complete search history.

(56) References Cited

U.S. PATENT DOCUMENTS 5,028,864 A * 7/1991 Lee ........................ G01R 23/17
250/339.08
5,917,596 A 6/1999 Jenkins et al.
(Continued)

FOREIGN PATENT DOCUMENTS

KR 101227803 B1 1/2013
KR 1020160017363 A 2/2016
(Continued)

OTHER PUBLICATIONS

Akhmanov, et al., Interaction of powerful laser radiation with the surfaces of semiconductors and metals: nonlinear optical effects and nonlinear diagnostics, Sov. Phys. Usp. 28 (12), Dec. 1985, pp. 1084-1124.

(Continued)

Primary Examiner — Steven W Crabb
Assistant Examiner — Lawrence H Samuels
(74) Attorney, Agent, or Firm — CANTOR COLBURN LLP

(57) ABSTRACT

A laser annealing device includes a laser generator, a beam splitter, a λ/2 phase difference member, a first reflective member, and a second reflective member. The laser generator emits a laser beam. The beam splitter splits the laser beam into a first reflective light and a transmissive light. The λ/2 phase difference member changes a polarization component of the transmissive light. The first reflective member reflects the transmissive light having the changed polarization component. The second reflective member reflects the transmissive light having the changed polarization component in a way such that the transmissive light having the changed polarization component which is reflected from the first reflective member is incident to the beam splitter.

20 Claims, 11 Drawing Sheets

(51) Int. Cl.
    *G02B 17/00*     (2006.01)
    *G02B 27/10*     (2006.01)
    *G02B 27/14*     (2006.01)

(56) References Cited

U.S. PATENT DOCUMENTS

| | | | |
|---|---|---|---|
| 6,617,648 B1* | 9/2003 | Yamazaki | H01L 29/66765 |
| | | | 257/E29.294 |
| 10,654,130 B2* | 5/2020 | Cho | G02B 27/0905 |
| 2007/0146676 A1* | 6/2007 | Tanitsu | G03F 7/705 |
| | | | 355/71 |
| 2014/0076863 A1 | 3/2014 | Moffitt | |
| 2015/0231735 A1* | 8/2015 | Moffitt | B23K 26/0604 |
| | | | 219/121.61 |
| 2016/0013046 A1* | 1/2016 | Srinivasan | C23C 16/4412 |
| | | | 118/725 |
| 2016/0252732 A1* | 9/2016 | Cho | G02B 27/0905 |
| | | | 219/121.6 |
| 2017/0087664 A1* | 3/2017 | Cho | B23K 26/354 |
| 2019/0351511 A1* | 11/2019 | Ryu | G02B 27/28 |

FOREIGN PATENT DOCUMENTS

| | | |
|---|---|---|
| KR | 1020160105610 A | 9/2016 |
| KR | 1020170024644 A | 3/2017 |
| KR | 1020170051613 A | 5/2017 |
| WO | WO-2018151581 A1 * | 8/2018 ......... B23K 26/0604 |

OTHER PUBLICATIONS

Young, et al., Laser-induced periodic surface structure. II. Experiments on Ge, Si, Al, and brass, Physical Review B, vol. 27, No. 2, Jan. 15, 1983, pp. 1155-1172 (with 9 added pages of images and descriptions) 27 pages total.

\* cited by examiner

FIG. 6

Comparative example

| | OL1 | OL2 | OL3 | OL4 | OL5 | OL6 | OL7 | OL8 | OL9 | OL10 | OL11 | ... | Sum OBL(%) |
|---|---|---|---|---|---|---|---|---|---|---|---|---|---|
| | 33.00% | 43.56% | 14.37% | 4.74% | 1.57% | 0.52% | 0.17% | 0.06% | 0.02% | 0.01% | 0.00% | ... | 99.0% |
| P-POL (55%) | 18.15% | 23.96% | 7.91% | 2.61% | 0.86% | 0.28% | 0.09% | 0.03% | 0.01% | 0.00% | 0.00% | ... | 55.0% |
| S-POL (45%) | 14.85% | 19.60% | 6.47% | 2.13% | 0.70% | 0.23% | 0.08% | 0.03% | 0.01% | 0.00% | 0.00% | ... | 45.0% |

Experimental example

| | OL1 | OL2 | OL3 | OL4 | OL5 | OL6 | OL7 | OL8 | OL9 | OL10 | OL11 | ... | Sum OBL(%) |
|---|---|---|---|---|---|---|---|---|---|---|---|---|---|
| | 33.00% | 43.56% | 14.37% | 4.74% | 1.57% | 0.52% | 0.17% | 0.06% | 0.02% | 0.01% | 0.00% | ... | 99.0% |
| P-POL (55%) | 18.15% | 19.60% | 7.91% | 2.13% | 0.86% | 0.23% | 0.09% | 0.03% | 0.01% | 0.00% | 0.00% | ... | 49.5% |
| S-POL (45%) | 14.85% | 23.96% | 6.47% | 2.61% | 0.70% | 0.28% | 0.08% | 0.03% | 0.01% | 0.00% | 0.00% | ... | 49.5% |

LASER ANNEALING DEVICE

This application claims priority to Korean Patent Application No. 10-2019-0068022, filed on Jun. 10, 2019, and all the benefits accruing therefrom under 35 U.S.C. § 119, the content of which in its entirety is herein incorporated by reference.

BACKGROUND

1. Field

Embodiments relate generally to a laser annealing device. More particularly, embodiments of the invention relate to a laser annealing device changing a polarization component of a laser beam.

2. Description of the Related Art

An excimer laser annealing ("ELA") process may be performed on an active layer included in a semiconductor device in a process of fabricating an organic light emitting display device. Such an active layer may include amorphous silicon, for example, and the amorphous silicon may be crystallized into polysilicon through the ELA process.

A laser annealing device may be used to perform the ELA process. The laser annealing device may include a laser generator for emitting a laser beam, a beam splitter for splitting the laser beam, reflective members for reflecting the laser beam, and the like. The beam splitter may transmit and reflect a portion of the laser beam emitted from the laser generator. The light reflected from the beam splitter may be defined as a first output light. In addition, a light passed through the beam splitter may be incident back to the beam splitter through the reflective members. In this case, the light passed through the beam splitter may be defined as second output light, and a plurality of output lights passed through the beam splitter may be generated after a loop routine is repeated in which the light reflected from the beam splitter is incident back to the reflective members and the beam splitter. An output laser beam may be generated by mixing the first and second output lights with the plurality of output lights. The ELA process may be performed by irradiating the active layer with the output laser beam.

SUMMARY

When irradiating an active layer in a semiconductor device with an output laser beam, grains of the active layer may be formed unevenly due to the polarization component of the output laser beam, thereby causing a defect of the semiconductor device.

Exemplary embodiments provide a laser annealing device that changes a polarization component of a laser beam.

According to an exemplary embodiment, a laser annealing device includes a laser generator, a beam splitter, a $\lambda/2$ phase difference member, a first reflective member, and a second reflective member. In such an embodiment, the laser generator emits a laser beam. The beam splitter splits the laser beam into a first reflective light and a transmissive light. The $\lambda/2$ phase difference member changes a polarization component of the transmissive light. The first reflective member reflects the transmissive light having a changed polarization component by passing through the $\lambda/2$ phase difference member. The second reflective member reflects the transmissive light having the changed polarization component in a way such that the transmissive light having the changed polarization component which is reflected from the first reflective member is incident to the beam splitter.

In an exemplary embodiment, an optical axis of the $\lambda/2$ phase difference member may be about 45°.

In an exemplary embodiment, the first reflective light reflected from the beam splitter may be defined as a first output light. In such an embodiment, the transmissive light having the changed polarization component which passes the beam splitter after reflected from the second reflective member may be defined as a second output light, and the transmissive light having the changed polarization component which is reflected from the beam splitter after reflected from the second reflective member may be defined as a second reflective light.

In an exemplary embodiment, the polarization component may be defined as a P-polarization beam and an S-polarization beam. In such an embodiment, a proportion of the P-polarization beam may be higher than a proportion of the S-polarization beam in the polarization component of the first output light, and a proportion of the P-polarization beam may be lower than a proportion of the S-polarization beam in the polarization component of the second output light.

In an exemplary embodiment, a proportion of the P-polarization beam may be higher than a proportion of the S-polarization beam in a polarization component of the laser beam emitted from the laser generator.

In an exemplary embodiment, after a loop routine is repeated in which the second reflective light is incident to the $\pi/2$ phase difference member, the first reflective member, the second reflective member and the beam splitter, a plurality of output lights passed through the beam splitter may be generated, and an output laser beam may be generated by mixing the first and second output lights with the plurality of output lights.

In an exemplary embodiment, a proportion of P-polarization beam may be equal to a proportion of an S-polarization beam in a polarization component of the output laser beam.

In an exemplary embodiment, the P-polarization beam may be defined in a direction parallel to the output laser beam, and the S-polarization beam may be defined in a direction perpendicular to the output laser beam.

In an exemplary embodiment, the laser annealing device may further include an attenuator disposed between the laser generator and the beam splitter.

In an exemplary embodiment, a proportion of the S-polarization beam in a polarization component of the laser beam may be reduced when the laser beam emitted from the laser generator passes through the attenuator.

In an exemplary embodiment, a portion of the transmissive light having the changed polarization component which is reflected from the second reflective member may pass through the $\lambda/2$ phase difference member, and a remaining portion of the transmissive light having the changed polarization component may be reflected from the $\lambda/2$ phase difference member.

In an exemplary embodiment, the beam splitter may invert a pulse shape of the laser beam.

In an exemplary embodiment, the $\lambda/2$ phase difference member may be disposed between the beam splitter and the first reflective member.

In an exemplary embodiment, after the transmissive light having the changed polarization component which passes through the $\lambda/2$ phase difference member may be reflected from the first reflective member, the transmissive light having the changed polarization component which is reflected from the first reflective member may be incident to the second reflective member without passing through the λ/2 phase difference member.

According to some exemplary embodiments, a laser annealing device includes a laser generator, a beam splitter, a λ/4 phase difference member, a first reflective member, and a second reflective member. In such an embodiment, the laser generator emits a laser beam. In such an embodiment, the beam splitter splits the laser beam into a first reflective light and a transmissive light. In such an embodiment, the λ/4 phase difference member changes a polarization component of the transmissive light, and has an optical axis of about 45°. In such an embodiment, the first reflective member is disposed in contact with a rear surface of the λ/4 phase difference member to reflect the transmissive light having a changed polarization component by passing through the λ/4 phase difference member. In such an embodiment, the second reflective member reflects the transmissive light having the changed polarization component in a way such that the transmissive light having the changed polarization component is incident to the beam splitter, after the transmissive light having the changed polarization component and reflected from the first reflective member passes through the λ/4 phase difference member.

In an exemplary embodiment, the first reflective light reflected from the beam splitter may be defined as a first output light. In such an embodiment, the transmissive light having the changed polarization component which passes the beam splitter after reflected from the second reflective member may be defined as a second output light, and the transmissive light having the changed polarization component which is reflected from the beam splitter after reflected from the second reflective member may be defined as a second reflective light.

In an exemplary embodiment, the polarization component may be defined as a P-polarization beam and an S-polarization beam. In such an embodiment, a proportion of the P-polarization beam may be higher than a proportion of the S-polarization beam in a polarization component of the first output light, and a proportion of the P-polarization beam may be lower than a proportion of the S-polarization beam in a polarization component of the second output light.

In an exemplary embodiment, a proportion of the P-polarization beam may be higher than a proportion of the S-polarization beam in a polarization component of the laser beam emitted from the laser generator.

In an exemplary embodiment, after a loop routine is repeated in which the second reflective light is incident to the λ/4 phase difference member, the first reflective member, the λ/4 phase difference member, the second reflective member, and the beam splitter, a plurality of output lights passing through the beam splitter may be generated, and an output laser beam may be generated by mixing the first and second output lights with the plurality of output lights.

In an exemplary embodiment, the transmissive light having the changed polarization component which passes through the λ/4 phase difference member may be reflected from the first reflective member, and the transmissive light having the changed polarization component which is reflected from the first reflective member may pass through the λ/4 phase difference member and then may be incident to the second reflective member.

In exemplary embodiments of the laser annealing device according to the invention, the laser annealing device includes the beam splitter and the λ/2 phase difference member as disclosed herein, such that the laser annealing device may ensure the uniformity of beam profile and the uniformity of grain.

BRIEF DESCRIPTION OF THE DRAWINGS

The above and other features of embodiments of the invention will be more apparent from the following description taken in conjunction with the accompanying drawings, in which:

FIG. 6 is a table showing an experimental example and a comparative example of the polarization component of the output light of the laser annealing device;

DETAILED DESCRIPTION

Figure 1:
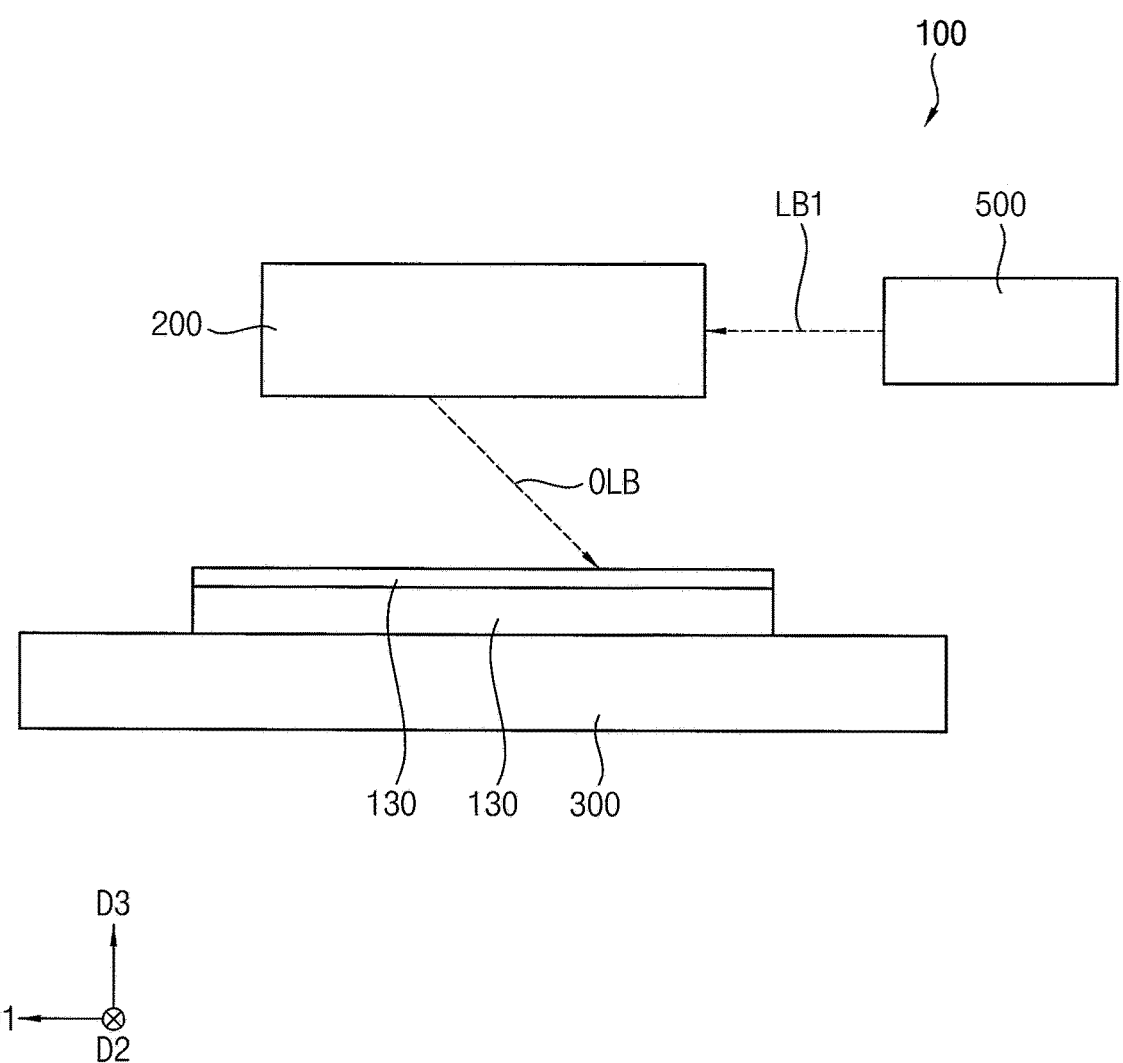
FIG. 1 is a schematic view showing a laser annealing device according to exemplary embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Expressions such as "at least one of," when preceding a list of elements, modify the entire list elements and do not modify the individual elements of the list. For example, the expression "at least one of a, b or c" indicates only a, only b, only c, both a and b, both a and c, both b and c, all of a, b, and c, or variations thereof.

It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of a laser annealing device according to the invention will be described in detail with reference to the accompanying drawings.

Figure 2:
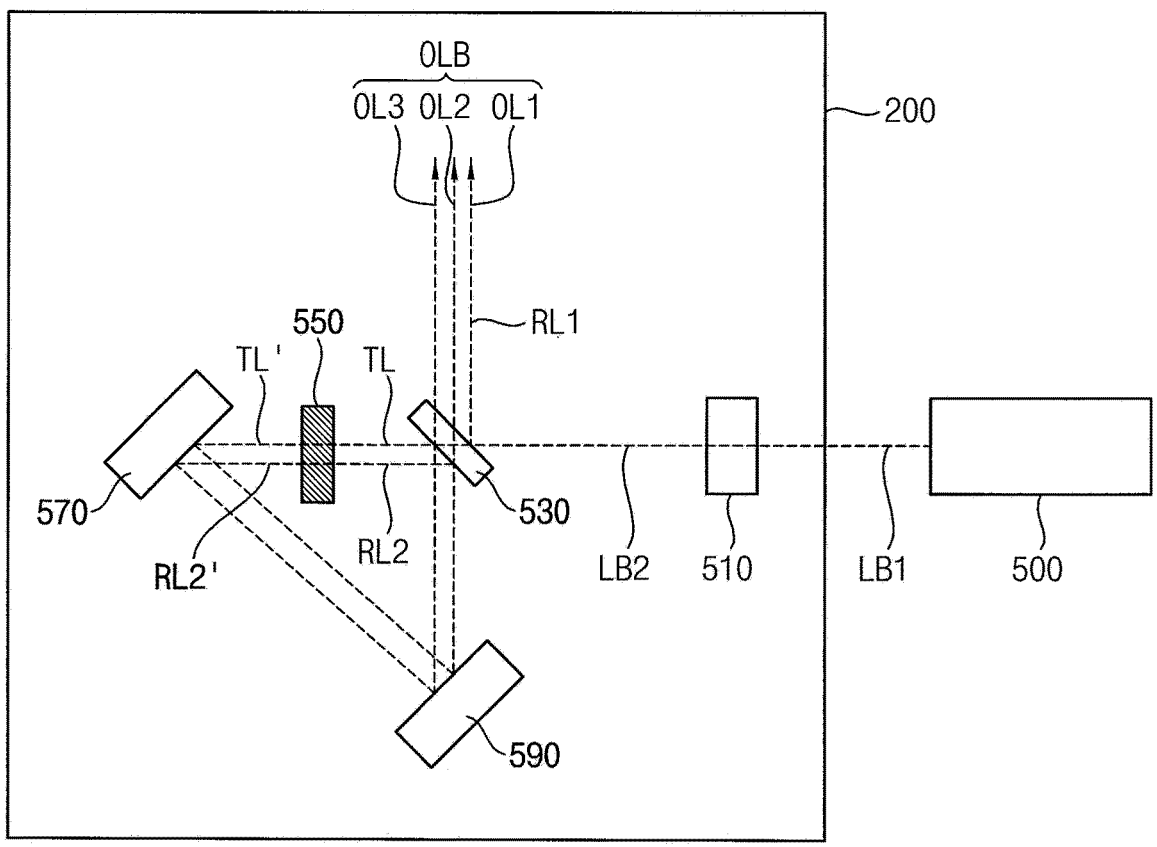
FIG. 2 is a view showing a configuration of an exemplary embodiment of an optical module included in the laser annealing device of FIG. 1.
Figure 2:
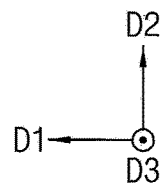
Figure 3:
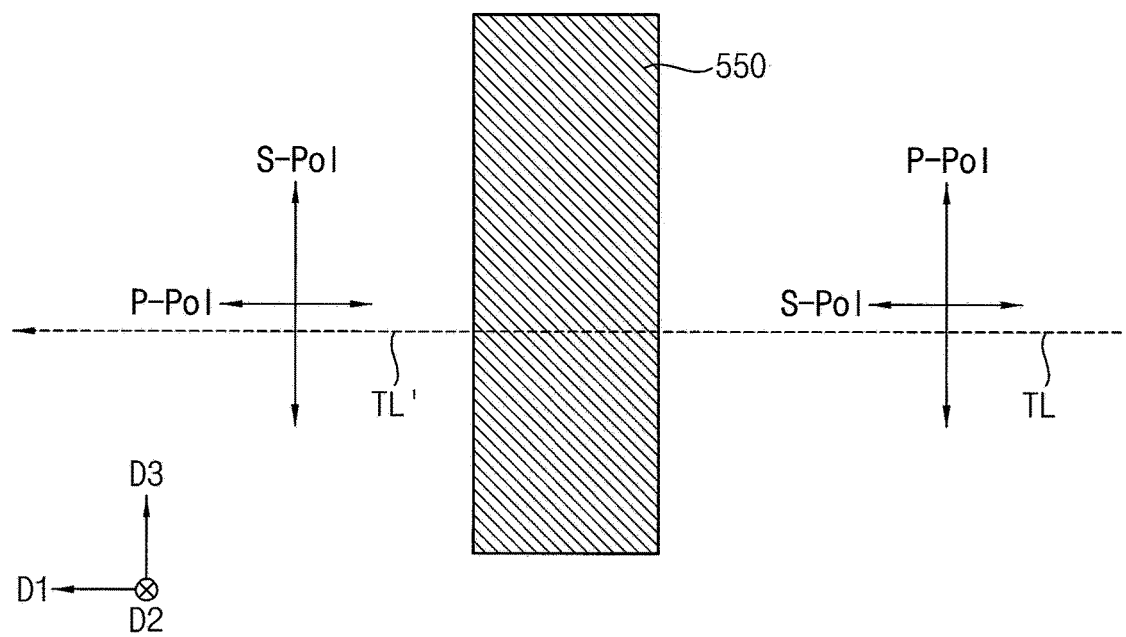
FIGS. 3, 4 and 5 are views illustrating polarization components of the laser beam generated from the laser annealing device of FIG. 1.
Figure 4:
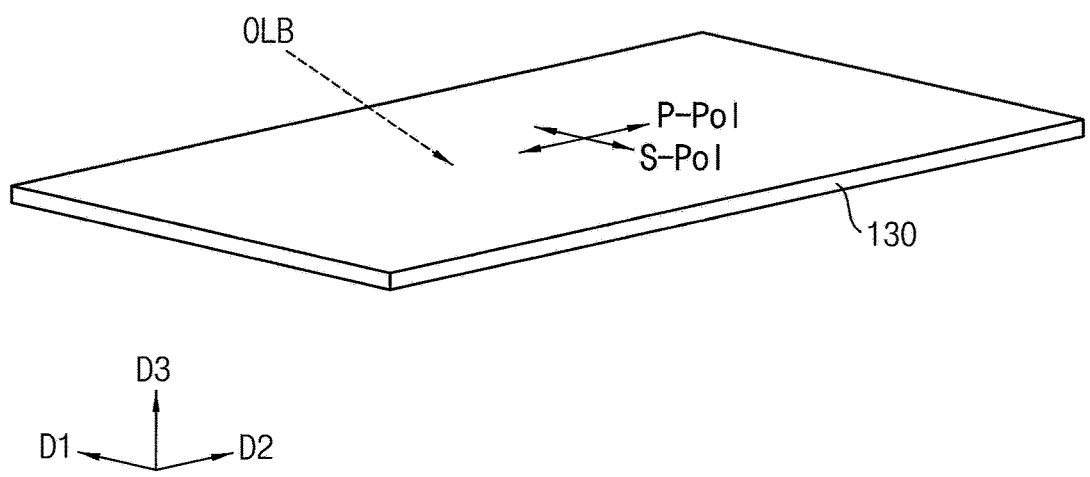
Figure 5:
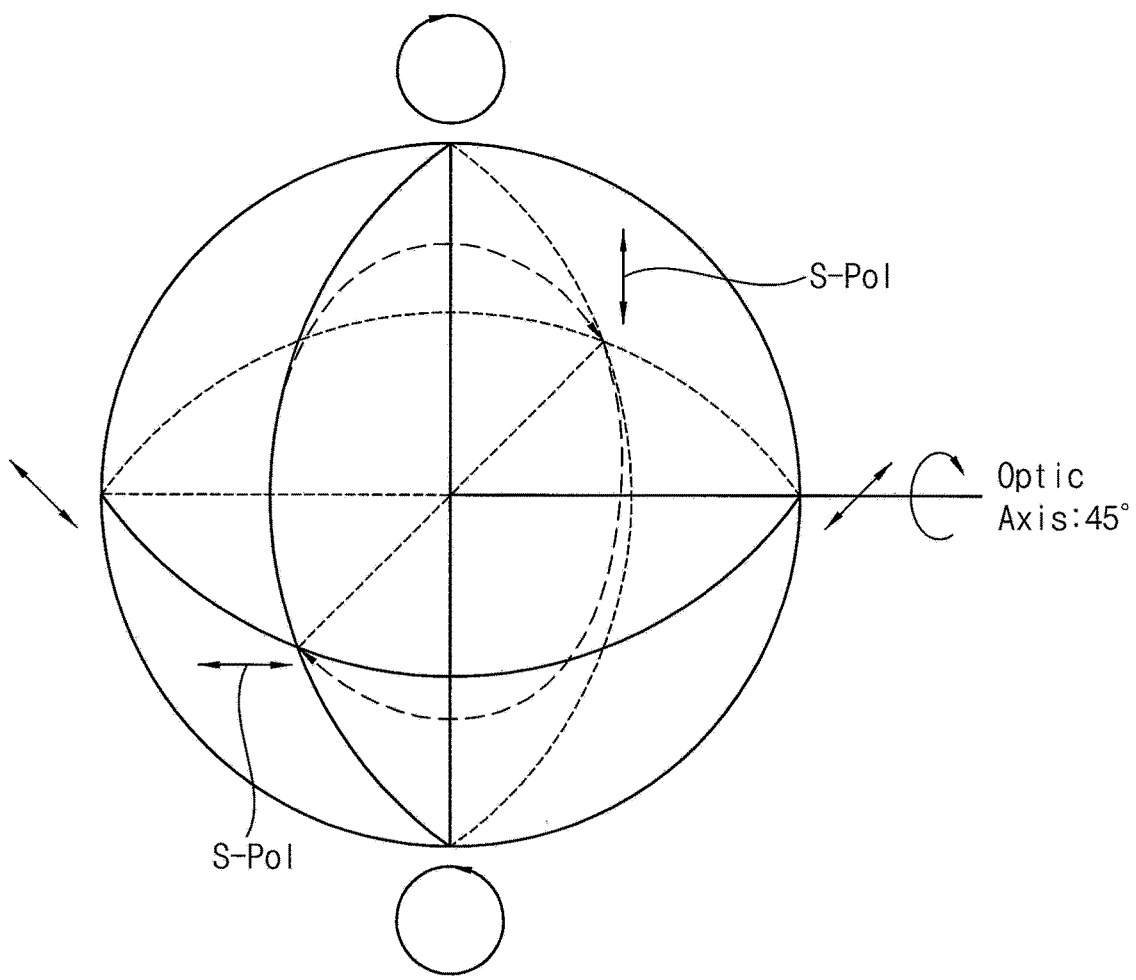

FIG. 1 is a schematic view showing a laser annealing device according to an exemplary embodiment of the invention. FIG. 2 is a view showing a configuration of an exemplary embodiment of an optical module included in the laser annealing device of FIG. 1. FIGS. 3, 4 and 5 are views illustrating polarization components of the laser beam generated from the laser annealing device of FIG. 1. More particularly, FIG. 1 may correspond to a side view of the laser annealing device, and FIG. 2 may correspond to a plan view of the laser annealing device, and shows a traveling path of the laser beam incident to an optical module.

Referring to FIGS. 1 and 2, an exemplary embodiment of the laser annealing device 100 may include a laser generator 500, an optical module 200, a stage 300, and the like. In an exemplary embodiment, as shown in FIG. 2, the optical module 200 may include an attenuator 510, a beam splitter 530, a λ/2 phase difference (e.g., a half-wavelength retardation) member 550, a first reflective member 570 and a second reflective member 590. In an exemplary embodiment, a substrate 110, for example, a glass substrate or a plastic substrate, may be disposed on the stage 300, and an amorphous silicon layer 130 may be formed on the substrate 110. The laser annealing device 100 may crystallize the amorphous silicon layer 130 by using an output laser beam OLB output through the optical module 200.

The laser generator 500 may generate a laser beam, and may emit the laser beam in a first direction D1. The laser beam emitted from the laser generator 500 may be defined as a first laser beam LB1. The laser generator 500 may generate a gas laser. In one exemplary embodiment, for example, the laser generator 500 may emit a raw beam of 15 millimeters (mm)×35 mm in a pulse manner by using XeCl excimer laser having a wavelength of approximately 308 nanometer (nm), and the raw beam may be changed into a line beam through the optical module 200. The laser annealing device 100 may crystallize the amorphous silicon layer 130 into polysilicon using the line beam.

In an exemplary embodiment, the attenuator 510 may be disposed in a traveling direction of the first laser beam LB1. In such an embodiment, the attenuator 510 may be disposed between the laser generator 500 and the beam splitter 530. The attenuator 510 may adjust an intensity (such as energy) of the first laser beam LB1. In such an embodiment, the first laser beam LB1 may pass through the attenuator 510, and the first laser beam LB1 passed through the attenuator 510 may be defined as a second laser beam LB2.

In an exemplary embodiment, the beam splitter 530 may be disposed in a traveling direction of the second laser beam LB2. In such an embodiment, the beam splitter 530 may be disposed between the attenuator 510 and the λ/2 phase difference member 550. The beam splitter 530 may transmit a portion of an incident beam, and reflect a remaining portion of the incident beam at a predetermined angle. The beam splitter 530 may have a fixed angle with respect to attenuator 510. In an exemplary embodiment, the second laser beam LB2 incident to the beam splitter 530 may be split into a transmissive light TL and a first reflective light RL1.

In one exemplary embodiment, for example, a reflection rate of the beam splitter 530 is approximately 66%, and a transmission rate is approximately 33%. The first reflective light RL1 reflected from the beam splitter 530 may travel in a second direction D2 perpendicular to the first direction D1, and the first reflective light RL1 may be defined as the first output light OLB1. In such an embodiment, the transmissive light TL passed through the beam splitter 530 may travel in the first direction D1. In one exemplary embodiment, for example, when the laser generator 500 generates a laser beam, an asymmetrical structure of the laser beam may be observed in a spatial profile due to the characteristics of the gas laser. The beam splitter 530 may change the asymmetrical structure into a symmetrical structure. The beam splitter 530 may invert a pulse shape of the laser beam, and the symmetrical structure of the laser beam may be observed in the spatial profile through rotation in a short axial or long axial direction of the laser beam. In one exemplary embodiment, for example, when a first laser beam structure (such as a first asymmetrical structure) is observed in the first output light OL1, a second laser beam structure (such as a second asymmetric structure) symmetrical with the first laser beam structure may be observed in a second output light OL2 described below. In such an embodiment, the first laser beam structure (such as the second asymmetric structure) symmetrical with the second laser beam structure may be observed in a third output light OL3 described below. Accordingly, in such an embodiment, the first and second laser beam structures may be repeatedly generated and then superimposed into a single beam so that the symmetrical structure of the laser beam may be implemented in the spatial profile. Accordingly, the laser annealing device 100 may obtain beam profile uniformity.

In an exemplary embodiment, the $\lambda/2$ phase difference member 550 may be disposed in a traveling direction of the transmissive light TL. In such an embodiment, the $\lambda/2$ phase difference member 550 may be disposed between the beam splitter 530 and the first reflective member 570. The $\lambda/2$ phase difference member 550 may change a polarization component of the transmissive light TL. In an exemplary embodiment, an optical axis of the $\lambda/2$ phase difference member 550 may be approximately 45°. The $\lambda/2$ phase difference member 550 may have a fixed angle with respect to the beam splitter 530.

Herein, the polarization component of the transmissive light TL may be defined as a P-polarization beam (P-Pol) and an S-polarization beam (S-Pol). As shown in FIG. 3, after the transmissive light TL passes through the $\lambda/2$ phase difference member 550, a polarization state of the polarization component of the transmissive light TL may be changed. As shown in FIG. 4, the P-polarization beam P-Pol may be defined as a polarization component in a direction parallel to the output laser beam OLB (such as in the second direction D2), and the S-polarization beam S-Pol may be defined as a polarization component in a direction perpendicular to the output laser beam OLB. As shown in FIG. 5, referring to the Poincare Sphere, it can be seen that, when the $\lambda/2$ phase difference member 550 has an optical axis of 45°, the S-polarization beam S-Pol on a horizontal axis is changed into the S-polarization beam S-Pol on a vertical axis, after being shifted by $\lambda/2$ to the optical axis of 45°. Similarly, it can be seen that the P-polarization beam P-Pol on the vertical axis is changed into the P-polarization beam P-Pol on the horizontal axis, after being shifted by $\lambda/2$ to the optical axis of 45°. In other words, the polarization component of the transmissive light TL may include the S-polarization beam S-Pol on the horizontal axis and the P-polarization beam P-Pol on the vertical axis. The transmissive light TL passed through the $\lambda/2$ phase difference member 550 may be defined as a transmissive light TL' having a changed polarization component. When the transmissive light TL passes through the $\lambda/2$ phase difference member 550, S-polarization beam S-Pol and the P-polarization beam P-Pol of the transmissive light TL may be changed into a polarization component on the vertical axis and a polarization component on the horizontal axis, respectively, of the transmissive light TL' having the changed polarization component. Accordingly, as shown in FIG. 3, the P-polarization component and the S-polarization component of the transmissive light TL may be substantially the same as a S-polarization component and a P-polarization component of the transmissive light TL' having the changed polarization component, respectively. In an exemplary embodiment, the ratio of the P-polarization beam P-Pol to the S-polarization beam S-Pol in the transmissive light TL may be approximately 23.96%:19.60%. In the transmissive light TL' having the changed polarization component, the ratio of the P-polarization beam P-Pol to the S-polarization beam S-Pol may be approximately 19.60%:23.96%. Accordingly, the $\lambda/2$ phase difference member 550 may change only the polarization component of the transmissive light TL, and may not change an intensity or shape of the laser beam (such as the transmissive light TL). The transmissive light TL' having the changed polarization component after passing through the $\lambda/2$ phase difference member 550 may travel in the first direction D1.

Referring back to FIG. 2, the first reflective member 570 may be disposed in a traveling direction of the transmissive light TL' having the changed polarization component. The first reflective member 570 may reflect all incident beams at a predetermined angle. The first reflective member 570 may have a fixed angle with respect to the 212 phase difference member 550. In an exemplary embodiment, all of the transmissive light TL' having the changed polarization component and reflected from the first reflective member 570 may be incident to the second reflective member 590. In one exemplary embodiment, for example, after the transmissive light TL' having the changed polarization component by passing through the $\lambda/2$ phase difference member 550 is reflected from the first reflective member 570, the transmissive light TL' having the changed polarization component and reflected from the first reflective member 570 may be incident to the second reflective member 590 without passing through the $\lambda/2$ phase difference member 550. The first reflective member 570 may include a material, such as a metal, an alloy, or a mirror, capable of reflecting a laser beam.

The second reflective member 590 may be disposed in a traveling direction of the transmissive light TL' having the changed polarization component and reflected from the first reflective member 570 at a predetermined angle. The second reflective member 590 may reflect all incident beams at a predetermined angle. The second reflective member 590 may have a fixed angle with respect to the first reflective member 570. In an exemplary embodiment, the second reflective member 590 may reflect the transmissive light TL' having the changed polarization component and reflected from the first reflective member 570 so that all of the transmissive light TL' having the changed polarization component and reflected from the first reflective member 570 are incident to the beam splitter 530. The second reflective member 590 may include a same material as the first reflective member 570.

The beam splitter 530 may allow a portion of the transmissive light TL', which has the changed polarization component and is reflected from the second reflective member 590, to be transmitted, and may allow a remaining portion of the transmissive light TL', which has the changed polarization component and is reflected from the second reflective member 590, to be reflected at a predetermined angle. In an exemplary embodiments, the transmissive light TL' having the changed polarization component and being incident to the beam splitter 530 may be split into a second output light OL2 and a second reflective light RL2. In one exemplary embodiment, for example, a portion of the transmissive light TL' having the changed polarization component may be defined as the second output light OL2 after passing through the beam splitter 530 in the second direction D2, and a remaining portion of the transmissive light TL' having the changed polarization component may be defined as the second reflective light RL2 after being reflected from the beam splitter 530 in the first direction D1.

The λ/2 phase difference member 550 may be disposed in a traveling direction of the second reflective light RL2. In one exemplary embodiment, for example, a moving path of the second reflective light RL2 may be substantially the same as a moving path of the transmissive light TL. The λ/2 phase difference member 550 may change the polarization component of the second reflective light RL2. In one exemplary embodiment, for example, the polarization component of the second reflective light RL2 may include an S-polarization beam S-Pol on a vertical axis and a P-polarization beam P-Pol on a horizontal axis. In addition, when the second reflective light RL2 passes through the λ/2 phase difference member 550, the polarization component of the second reflective light RL2 may be changed into a P-polarization beam P-Pol on a vertical axis and an S-polarization beam S-Pol on a horizontal axis (see FIG. 5). The second reflective light RL2 passed through the λ/2 phase difference member 550 may be defined as a second reflective light RL2' having a changed polarization component. In an exemplary embodiment, the ratio of the P-polarization beam P-Pol to the S-polarization beam S-Pol in the second reflective light RL2 may be approximately 6.47%:7.91%. In the second reflective light RL2' having the changed polarization component, the ratio of the P-polarization beam P-Pol to the S-polarization beam S-Pol may be approximately 7.91%:6.47%. In other words, the λ/2 phase difference member 550 may change only the polarization component of the second reflective light RL2, and may not change an intensity or shape of the laser beam (such as the second reflective light RL2). The second reflective light RL2' having the changed polarization component after passing through the λ/2 phase difference member 550 may travel in the first direction D1.

The first reflective member 570 may be disposed in the traveling direction of the second reflective light RL2' having the changed polarization component. In one exemplary embodiment, for example, a moving path of the second reflective light RL2' having the changed polarization component may be substantially the same as the moving path of the transmissive light TL' having the changed polarization component. In an exemplary embodiments, all of the second reflective light RL2' having the changed polarization component and reflected from the first reflective member 570 may be incident to the second reflective member 590.

The second reflective member 590 may be disposed in the traveling direction of the second reflective light RL2' having the changed polarization component and reflected from the first reflective member 570 at a predetermined angle. In an exemplary embodiment, the second reflective member 590 may reflect the second reflective light RL2' having the changed polarization component and reflected from the first reflective member 570 so that all of the second reflective light RL2' having the changed polarization component and reflected from the first reflective member 570 are incident to the beam splitter 530.

The beam splitter 530 may allow a portion of the second reflective light RL2', which has the changed polarization component and is reflected from the second reflective member 590, to be transmitted, and may allow a remaining portion of the second reflective light RL2', which has the changed polarization component and is reflected from the second reflective member 590, to be reflected at a predetermined angle. In an exemplary embodiment, the second reflective light RL2' having the changed polarization component and being incident to the beam splitter 530 may be split into a third output light OL3 and a third reflective light RL3 (not shown). In one exemplary embodiment, for example, a portion of the second reflective light RL2' having the changed polarization component may be defined as the third output light OL3 after passing through the beam splitter 530 in the second direction D2, and a remaining portion of the second reflective light RL2' having the changed polarization component may be defined as the third reflective light RL3 after being reflected in the first direction D1 from the beam splitter 530.

In such an embodiment, a plurality of output lights passed through the beam splitter may be generated after repeating a loop routine in which the third reflective light is incident to the λ/2 phase difference member 550, the first reflective member 570, the second reflective member 590 and the beam splitter 530. An output laser beam OBL may be generated by mixing the first output light OL1, the second output light OL2 and the third output light OL3 with the plurality of output lights. In an exemplary embodiment, the ratio of polarization component of the first output light OL1 (P-polarization beam P-Pol:S-polarization beam S-Pol) may be approximately 18.15%:14.85%, the ratio of polarization component of the second output light OL2 may be approximately 19.60%:23.96%, and the ratio of polarization component of the third output light OL3 may be approximately 7.91%:6.47%. In such an embodiment, the P-polarization beam P-Pol in the ratio of polarization component of the first output light OL1 may be greater than the S-polarization beam S-Pol, the P-polarization beam P-Pol in the ratio of polarization component of the second output light OL2 may be smaller than the S-polarization beam S-Pol, and the P-polarization beam P-Pol in the ratio of polarization component of the third output light OL3 may be greater than the S-polarization beam S-Pol. In such an embodiment, the ratio of the polarization component of the output laser beam OBL generated by mixing the first output light OL1, the second output light OL2 and the third output light OL3 with the plurality of output lights may be approximately 49.5%:49.5%. In one exemplary embodiment, for example, when the ratio of the polarization component is evenly distributed, grains may grow uniformly upon crystallizing the amorphous silicon layer 130. When the uniformity of the grain is improved, a level of stains, which may be generated during the excimer laser annealing process, may be reduced.

An exemplary embodiment of the laser annealing device 100 according to the invention may include the beam splitter 530 and the λ/2 phase difference member 550, such that the laser annealing device 100 may ensure the uniformity of beam profile and the uniformity of grain.

For convenience of illustration and description, FIG. 2 shows that a path of the laser beam is not refracted in each inside of the attenuator 510, the beam splitter 530, and the λ/2 phase difference member 550, but the path of the laser beam may be refracted inside the attenuator 510, the beam splitter 530, or the λ/2 phase difference member 550.

Figure 7:
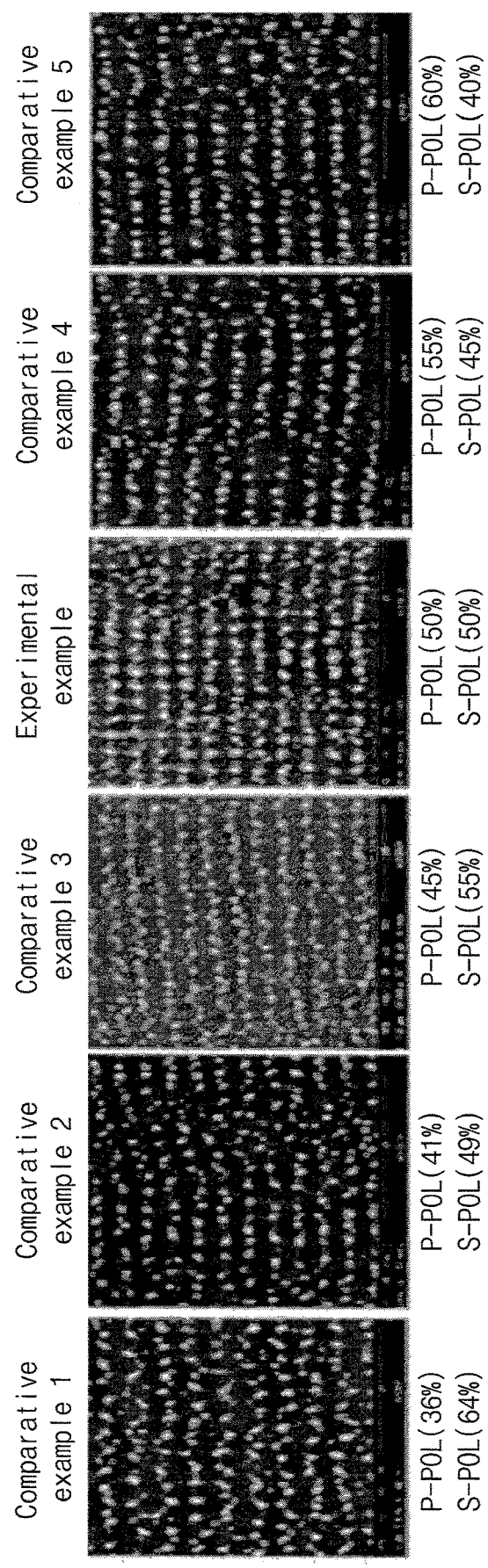
FIG. 7 shows images on grain of polysilicon of the experimental example and comparative examples according to the polarization component.

FIG. 6 is a table showing an experimental example and a comparative example of the polarization component of the output light of the laser annealing device. FIG. 7 shows images on grain of polysilicon of the experimental example and comparative examples of the polarization component of FIG. 6.

Referring to FIGS. 6 and 7, the comparative example shows the ratio of the polarization component of the output laser beam OLB of the laser annealing device that does not include the $\lambda/2$ phase difference member 550, and the experimental example shows the ratio of the polarization component of the output laser beam OLB of the laser annealing device that includes the $\lambda/2$ phase difference member 550.

The ratio of polarization component of the first laser beam LB1 (P-polarization beam P-Pol:S-polarization beam S-Pol) may be approximately 50%:50%. After the first laser beam LB1 passes through the attenuator 510, the ratio of polarization component of the second laser beam LB2 may be approximately 55%:45%. In one exemplary embodiment, for example, a relatively greater portion of the S-polarization beam S-Pol in the polarization components of the first laser beam LB1 may be lost than the P-polarization beam P-Pol in the polarization components of the first laser beam LB1 in the process that the attenuator 510 adjusts the intensity of the first laser beam LB1. In such an embodiment, when the first laser beam LB1 emitted from the laser generator 500 passes through the attenuator 510, the proportion of the S-polarization beam S-Pol in the polarization components of the first laser beam LB1 may be reduced.

In the comparative example, the second laser beam LB2 having the ratio of approximately 55%:45% of the polarization component may be split into a transmissive light TL passed through the beam splitter 530 and a first output light OL1 reflected from the beam splitter 530. The beam splitter 530 may reflect approximately 66% of the second laser beam LB2, and allow approximately 33% of the second laser beam LB2 to be transmitted. Accordingly, the ratio of the polarization component of the first output light OL1 may be approximately 18.15%:14.85%.

After repeating a loop routine in which the transmissive light TL is incident to the first reflective member 570, the second reflective member 590 and the beam splitter 530, a plurality of output lights (for example, the second output light OL2 to n-th output light OLn, where n is an integer of 3 or more) passed through the beam splitter 530 may be generated.

The output laser beam OLB may be defined by mixing the first output light OL1 to the n-th output light OLn. Accordingly, the ratio of polarization component of the output laser beam OLB may be approximately 55%:45%. As shown in FIG. 7, it can be seen that the comparative example of FIG. 6 may correspond to a comparative example (Comparative example 4), and the grain uniformity is lower than that of the experimental example.

Referring back to FIG. 6, in the above experimental example, the second laser beam LB2 having the ratio of approximately 52%:39% of the polarization component may be split into a transmissive light TL passing through the beam splitter 530 and a first output light OL1 reflected from the beam splitter 530. The beam splitter 530 may reflect approximately 66% of the second laser beam LB2, and allow approximately 33% of the second laser beam LB2 to be transmitted. Accordingly, the ratio of the polarization component of the first output light OL1 may be approximately 18.15%:14.85%.

After repeating a loop routine in which the transmissive light TL is incident to the $\lambda/2$ phase difference member 550, the first reflective member 570, the second reflective member 590 and the beam splitter 530, a plurality of output lights (for example, the second output light OL2 to the n-th output light OLn (n is an integer of 3 or greater) passed through the beam splitter 530 may be generated. In one exemplary embodiment, for example, the ratio of the polarization component of the second output light OL2 may be approximately 19.60%:23.96%. Compared with the second output light OL2 of the comparative example, it can be seen that the proportions of the polarization components of the second output light OL2 of the experimental example were changed from each other because the $\lambda/2$ phase difference member 550 changed the polarization component of the transmissive light TL in the experimental example. In addition, the ratio of the polarization component of the third output light OL3 may be approximately 7.91%:6.47%. Compared with the third output light OL3 of the comparative example, because the $\lambda/2$ phase difference member 550 changed the polarization component of the second reflective light RL2 (for example, corresponding to the transmissive light TL reflected from the beam splitter 530 and then having passed through the $\lambda/2$ phase difference member 550) in the experimental example, the ratio of the polarization component of the third output light OL3 in the experimental example may be equal to the ratio of the polarization component of the third output light OL3 in the comparative example. In addition, the ratio of the polarization component of the fourth output light OL4 may be approximately 2.15%:2.61%. Compared with the fourth output light OL4 of the comparative example, it can be seen that the proportions of the polarization components of the fourth output light OL4 in the experimental example were changed from each other because the $\lambda/2$ phase difference member 550 changed the polarization component of the third reflective light RL3 (for example, corresponding to the second reflective light RL2 reflected from the beam splitter 530 and then having passed through the $\lambda/2$ phase difference member 550) in the experimental example. In the above manner, the ratio of the polarization component of each of the even-numbered output lights in the experimental example may be changed from each other.

The output laser beam OLB may be defined by mixing the first output light OL1 to the n-th output light OLn. Accordingly, the ratio of the polarization component of the output laser beam OLB in the experimental example may be approximately 49.5%:49.5%. As shown in FIG. 7, it can be seen that the uniformity of grain in the experimental example is greater than those of the first to fifth comparative examples (Comparative example 1 to 5).

Figure 8:
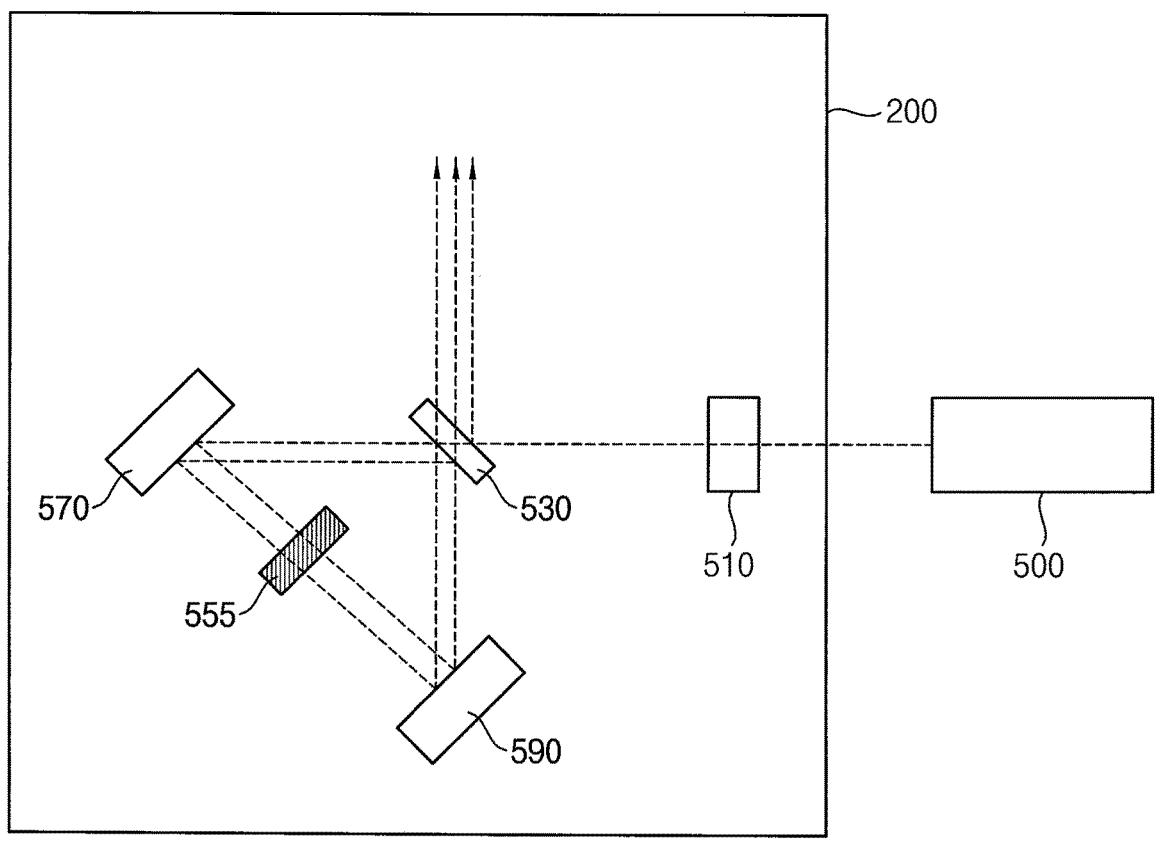
FIG. 8 is a block diagram showing an alternative exemplary embodiment of the laser annealing device of FIG. 1.
Figure 8:
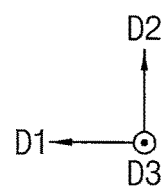
Figure 9:
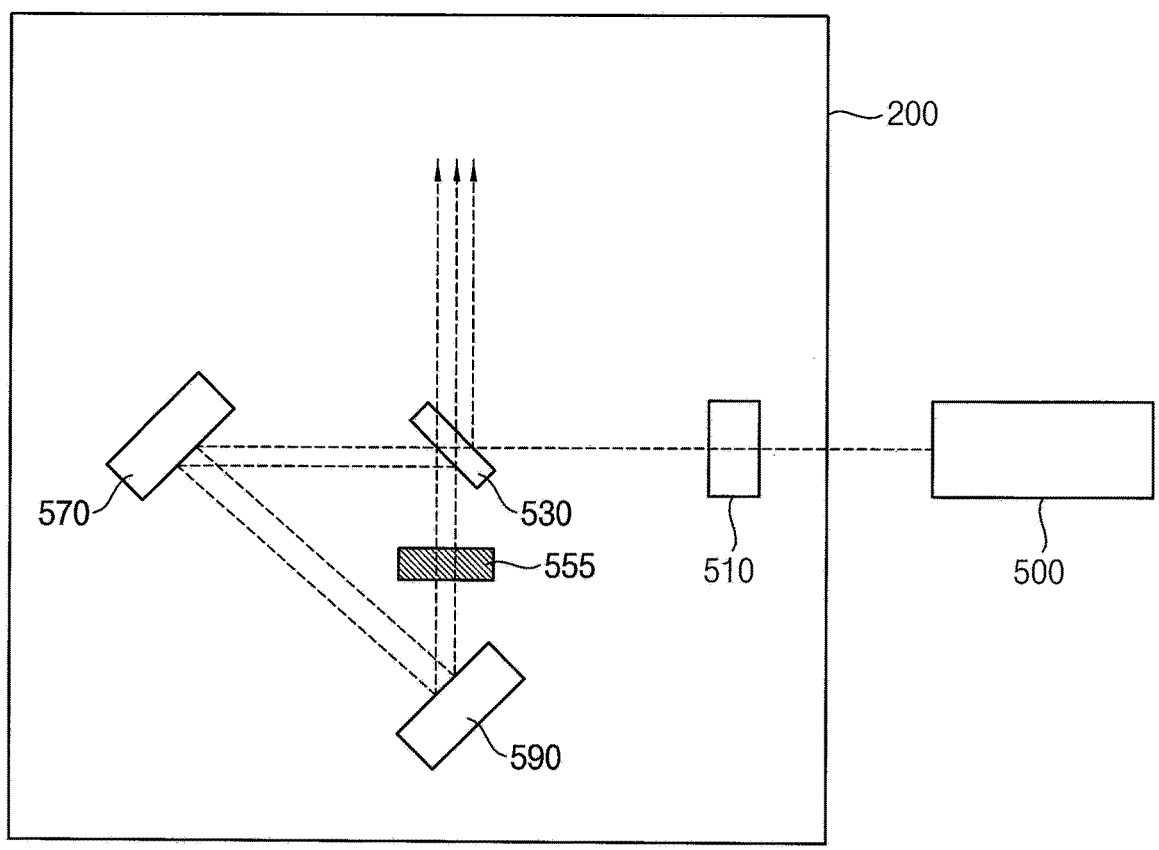
FIG. 9 is a view showing a configuration of another alternative embodiment of the laser annealing device of FIG. 1.
Figure 9:
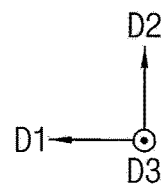

FIG. 8 is a block diagram showing an alternative exemplary embodiment of the laser annealing device of FIG. 1. FIG. 9 is a view showing a configuration of another alternative exemplary embodiment of the laser annealing device of FIG. 1. The laser annealing devices illustrated in FIGS. 8 and 9 may have a configuration substantially the same as or similar to that of the laser annealing device 100 described above with reference to FIGS. 1 to 7, except for a position of the $\lambda/2$ phase difference member 555. In FIGS. 8 and 9, the same or like elements shown in FIGS. 1 to 7 have been labeled with the same reference characters, and any repetitive detailed description thereof will be omitted or simplified.

Referring to FIG. 8, in an exemplary embodiment, the $\lambda/2$ phase difference member 555 may be disposed between the first reflective member 570 and the second reflective member 590. The $\lambda/2$ phase difference member 555 may change the polarization component of the transmissive light TL. In an exemplary embodiment, an optical axis of the $\lambda/2$ phase difference member 555 may be approximately 45°. The λ/2 phase difference member 555 may have a fixed angle with respect to the first reflective member 570 and the second reflective member 590.

Referring to FIG. 9, in an alternative exemplary embodiment, the λ/2 phase difference member 555 may be disposed between the beam splitter 530 and the second reflective member 590. The λ/2 phase difference member 555 may change the polarization component of the transmissive light TL. In an exemplary embodiment, an optical axis of the λ/2 phase difference member 555 may be approximately 45°. The λ/2 phase difference member 555 may have a fixed angle with respect to the beam splitter 530 and the second reflective member 590.

Figure 10:
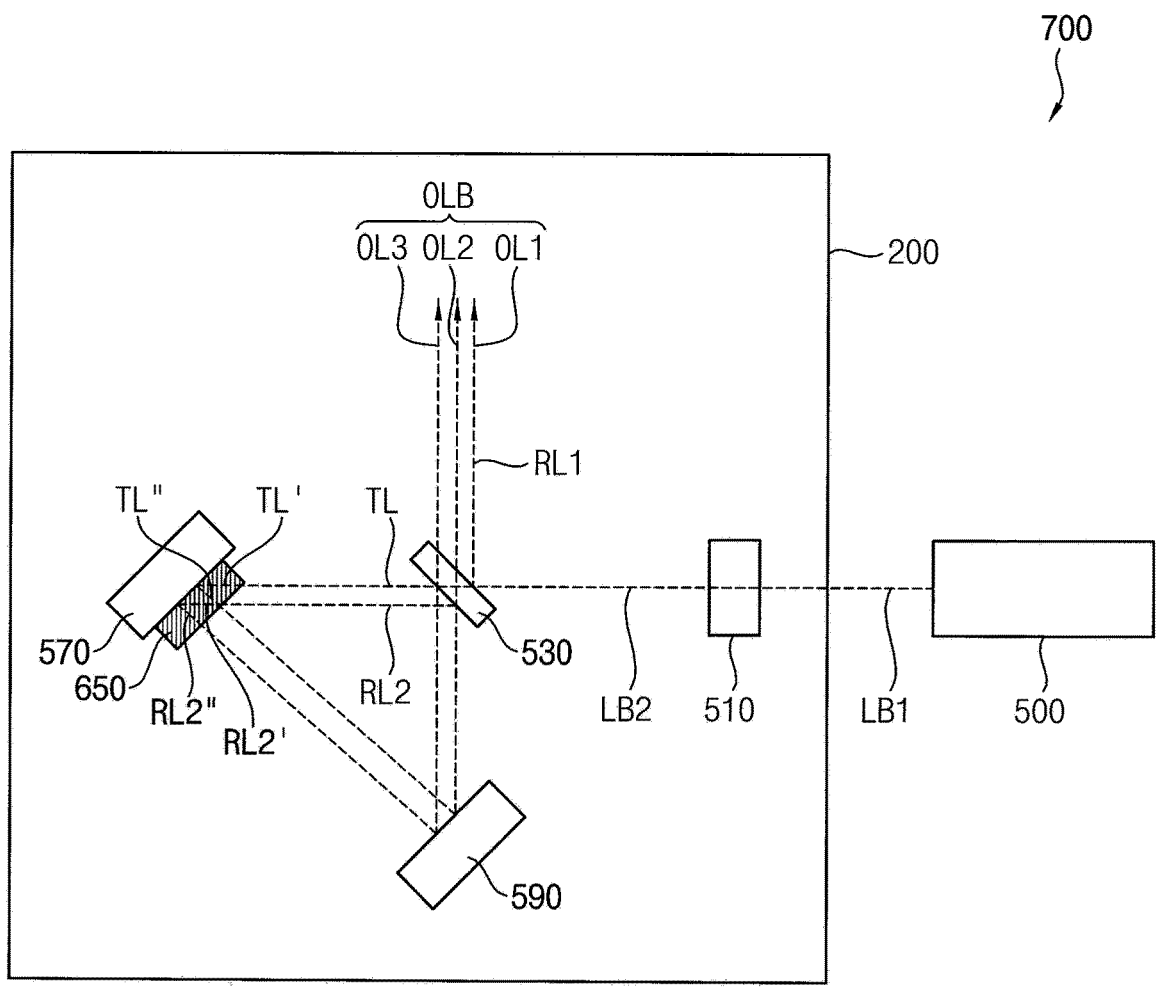
FIG. 10 is a view showing a configuration of a laser annealing device according to an alternative exemplary embodiment of the invention.
Figure 10:
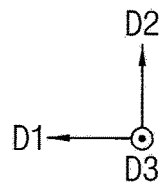

FIG. 10 is a view showing a configuration of a laser annealing device according to an alternative exemplary embodiment of the invention. FIG. 10 may correspond to a plan view of the laser annealing device, and shows a traveling path of the laser beam incident to the optical module. The laser annealing device 700 illustrated in FIG. 10 may have a configuration substantially the same as or similar to that of the laser annealing device 100 described with reference to FIGS. 1 to 7, except for a position of the λ/4 phase difference member 650. In FIGS. 8 and 9, the same or like elements shown in FIGS. 1 to 7 have been labeled with the same reference characters, and any repetitive detailed description thereof will be omitted.

Referring to FIGS. 1 and 10, in an exemplary embodiment, the laser annealing device 700 may include a laser generator 500, an optical module 200, a stage 300 and the like. The optical module 200 may include an attenuator 510, a beam splitter 530, a 214 phase difference (e.g., a quarter-wavelength retardation) member 650, a first reflective member 570 and a second reflective member 590. In such an embodiment, a substrate 110, for example, a glass substrate or a plastic substrate, may be disposed on the stage 300, and an amorphous silicon layer 130 may be formed on the substrate 110. The laser annealing device 100 may crystallize the amorphous silicon layer 130 by using an output laser beam OLB outputted through the optical module 200.

The laser generator 500 may generate a laser beam, and may emit the laser beam in a first direction D1. The laser beam emitted from the laser generator 500 may be defined as a first laser beam LB1.

In an exemplary embodiment, the attenuator 510 may be disposed in a traveling direction of the first laser beam LB1. In an such an embodiment, the attenuator 510 may be disposed between the laser generator 500 and the beam splitter 530. The first laser beam LB1 may pass through the attenuator 510, and the first laser beam LB1 passed through the attenuator 510 may be defined as a second laser beam LB2.

In an exemplary embodiment, the beam splitter 530 may be disposed in a traveling direction of the second laser beam LB2. In such an embodiment, the beam splitter 530 may be disposed between the attenuator 510 and the λ/4 phase difference member 550. The beam splitter 530 may transmit a portion of an incident beam, and reflect a remaining portion of the incident beam at a predetermined angle. The beam splitter 530 may have a fixed angle with respect to attenuator 510. In an exemplary embodiment, the second laser beam LB2 incident to the beam splitter 530 may be split into a transmissive light TL and a first reflective light RL1. In one exemplary embodiment, for example, a reflection rate of the beam splitter 530 is approximately 66%, and a transmission rate is approximately 33%. The first reflective light RL1 reflected from the beam splitter 530 may travel in a second direction D2 perpendicular to the first direction D1, and the first reflective light RL1 may be defined as the first output light OLB1. In such an embodiment, the transmissive light TL passed through the beam splitter 530 may travel in the first direction D1.

In an exemplary embodiment, the λ/4 phase difference member 650 may be disposed in a traveling direction of the transmissive light TL. In such an embodiment, the λ/4 phase difference member 650 may be located between the beam splitter 530 and the first reflective member 570 (or between the first reflective member 570 and the second reflective member 590), and may come into direct contact with a front surface of the first reflective member 570. The λ/4 phase difference member 555 may change the polarization component of the transmissive light TL. In an exemplary embodiment, an optical axis of the λ/4 phase difference member 650 may be approximately 45°. The λ/4 phase difference member 650 may have a fixed angle with respect to the beam splitter 530.

Herein, the polarization component of the transmissive light TL may be defined as a P-polarization beam P-Pol and an S-polarization beam S-Pol. After the transmissive light TL passes through the λ/4 phase difference member 650, a polarization state of the polarization component of the transmissive light TL may be changed. As shown in FIG. 4, the P-polarization beam P-Pol may be defined as a polarization component in a direction parallel to the output laser beam OLB (such as in the second direction D2), and the S-polarization beam S-Pol may be defined as a polarization component in a direction perpendicular to the output laser beam OLB. As shown in FIG. 5, referring to the Poincare Sphere, it can be seen that, when the λ/4 phase difference member 550 has an optical axis of 45°, the S-polarization beam S-Pol on a horizontal axis is changed into the S-polarization beam S-Pol having a clockwise circular polarization, after being shifted by λ/4 to the optical axis of 45°. Similarly, it can be seen that the P-polarization beam P-Pol on a vertical axis is changed into a P-polarization beam S-Pol having a counterclockwise circular polarization, after being shifted by λ/4 to the optical axis of 45°. In other words, the polarization component of the transmissive light TL may include the S-polarization beam S-Pol on the horizontal axis and the P-polarization beam P-Pol on the vertical axis. In addition, when the transmissive light TL passes through the λ/4 phase difference member 650, the polarization component of the transmissive light TL may be changed into the S-polarization beam S-Pol having a clockwise circular polarization and the P-polarization beam P-Pol having a counterclockwise circular polarization. The transmissive light TL passing through the λ/4 phase difference member 650 may be defined as a transmissive light TL' having a changed polarization component.

In an exemplary embodiment, the first reflective member 570 may be disposed in a traveling direction of the transmissive light TL' having the changed polarization component. In such an embodiment, the first reflective member 570 may be disposed in contact with a rear surface of the λ/4 phase difference member 650. In an alternative exemplary embodiment, the first reflective member 570 and the λ/4 phase difference member 650 may be spaced apart from each other by a predetermined distance. In such an embodiment, the predetermined distance may be determined in a way such that the transmissive light TL may be changed into a sub-transmissive light TL" having a changed polarization component.

The first reflective member 570 may reflect all incident beams at a predetermined angle. The first reflective member 570 may have a fixed angle with respect to the λ/4 phase difference member 650. In an exemplary embodiment, all of the transmissive light TL' having the changed polarization component and reflected from the first reflective member 570 may be incident to the λ/4 phase difference member 650.

In one exemplary embodiment, for example, after the transmissive light TL' having the changed polarization component by passing through the λ/4 phase difference member 650 is reflected from the first reflective member 570, the transmissive light TL' having the changed polarization component and reflected from the first reflective member 570 may pass through the λ/4 phase difference member 650 and then may be incident to the second reflective member 590. In one exemplary embodiment, for example, the transmissive light TL' having the changed polarization component may include the S-polarization beam S-Pol having a clockwise circular polarization and the P-polarization beam P-Pol having a counterclockwise circular polarization. After the transmissive light TL' having the changed polarization component passes through the λ/4 phase difference member 650, a polarization state of the polarization component may be changed. As shown in FIG. 5, referring to the Poincare Sphere, it can be seen that, when the λ/4 phase difference member 550 has an optical axis of 45°, the S-polarization beam S-Pol having a clockwise circular polarization is changed into the S-polarization beam S-Pol on the vertical axis, after being shifted by λ/4 to the optical axis of 45°. Similarly, it can be seen that the P-polarization beam P-Pol having a counterclockwise circular polarization is changed into the P-polarization beam P-Pol on the horizontal axis, after being shifted by λ/4 to the optical axis of 45°. In other words, the transmissive light TL' having the changed polarization component may include the S-polarization beam S-Pol having a clockwise circular polarization and the P-polarization beam P-Pol having a counterclockwise circular polarization. When the transmissive light TL' having the changed polarization component passes through the λ/4 phase difference member 650, the polarization component of the transmissive light TL' having the changed polarization component may be changed into the S-polarization beam S-Pol on the vertical axis and the P-polarization beam P-Pol on the horizontal axis. The transmissive light TL' passing through the λ/4 phase difference member 650 may be defined as a sub-transmissive light TL" having a changed polarization component.

In an exemplary embodiment, the ratio of the P-polarization beam P-Pol and the S-polarization beam S-Pol in the transmissive light TL may be approximately 23.96%: 19.60%. In the sub-transmissive light TL" having the changed polarization component, the ratio of the P-polarization beam P-Pol and the S-polarization beam S-Pol may be approximately 19.60%:23.96%. In such an embodiment, the λ/4 phase difference member 650 may change only the polarization component of the transmissive light TL, and may not change an intensity or shape of the laser beam (such as the transmissive light TL). The sub-transmissive light TL" having the changed polarization component and passing through the λ/4 phase difference member 650 may be incident to the second reflective member 590.

The second reflective member 590 may be disposed in a traveling direction of the sub-transmissive light TL" having the changed polarization component and passing through the λ/4 phase difference member 650. The second reflective member 590 may reflect all incident beams at a predetermined angle. The second reflective member 590 may have a fixed angle with respect to the first reflective member 570. In an exemplary embodiment, the second reflective member 590 may reflect the sub-transmissive light TL" having the changed polarization component so that all of the sub-transmissive light TL" having the changed polarization component by passing through the λ/4 phase difference member 650 are incident to the beam splitter 530.

The beam splitter 530 may allow a portion of the sub-transmissive light TL", which has the changed polarization component and is reflected from the second reflective member 590, to be transmitted, and may allow a remaining portion of the sub-transmissive light TL", which has the changed polarization component and is reflected from the second reflective member 590, to be reflected at a predetermined angle. In an exemplary embodiment, the sub-transmissive light TL" having the changed polarization component and being incident to the beam splitter 530 may be split into a second output light OL2 and a second reflective light RL2. In one exemplary embodiment, for example, a portion of the sub-transmissive light TL" having the changed polarization component may be defined as the second output light OL2 after passing through the beam splitter 530 in the second direction D2, and a remaining portion of the sub-transmissive light TL" having the changed polarization component may be defined as the second reflective light RL2 after being reflected from the beam splitter 530 in the first direction D1.

The λ/4 phase difference member 650 may be disposed in the traveling direction of the second reflective light RL2. In one exemplary embodiment, for example, a moving path of the second reflective light RL2 may be substantially the same as a moving path of the transmissive light TL. The λ/4 phase difference member 650 may change the polarization component of the second reflective light RL2. In one exemplary embodiment, for example, the polarization component of the second reflective light RL2 may include an S-polarization beam S-Pol on a vertical axis and a P-polarization beam P-Pol on a horizontal axis. In such an embodiment, when the second reflective light RL2 passes through the λ/4 phase difference member 650, the polarization component of the second reflective light RL2 may be changed into the S-polarization beam S-Pol having a counterclockwise circular polarization and the P-polarization beam P-Pol having a clockwise circular polarization (see FIG. 5). The second reflective light RL2 passing through the λ/4 phase difference member 650 may be defined as a second reflective light RL2' having a changed polarization component.

The first reflective member 570 may be disposed in the traveling direction of the second reflective light RL2' having the changed polarization component. In exemplary embodiments, all of the second reflective light RL2' having the changed polarization component and reflected from the first reflective member 570 may be incident to the λ/4 phase difference member 650. In one exemplary embodiment, for example, after the second reflective light RL2' having the changed polarization component and passing through the λ/4 phase difference member 650 is reflected from the first reflective member 570, the second reflective light RL2' having the changed polarization component and reflected from the first reflective member 570 may pass through the λ/4 phase difference member 650 and then may be incident to the second reflective member 590.

In one exemplary embodiment, for example, the second reflective light RL2' having the changed polarization component may include the S-polarization beam S-Pol having a counterclockwise circular polarization and the P-polarization beam P-Pol having a clockwise circular polarization. After the second reflective light RL2' having the changed polarization component passes the λ/4 phase difference member 650, a polarization state of the polarization component may be changed. When the λ/4 phase difference member 550 has an optical axis of 45°, the S-polarization beam S-Pol having a counterclockwise circular polarization may be changed into the S-polarization beam S-Pol on the horizontal axis, after being shifted by λ/4 to the optical axis of 45°, and the P-polarization beam P-Pol having the clockwise circular polarization may be changed into the P-polarization beam P-Pol on the vertical axis, after being shifted by λ/4 to the optical axis of 45° (see FIG. 5). In such an embodiment, the second reflective light RL2' having the changed polarization component may include the S-polarization beam S-Pol having a counterclockwise circular polarization and the P-polarization beam P-Pol having a clockwise circular polarization. When the second reflective light RL2' having the changed polarization component passes through the λ/4 phase difference member 650, the polarization component of the second reflective light RL2' having the changed polarization component may be changed into the S-polarization beam S-Pol on the horizontal axis and the P-polarization beam P-Pol on the vertical axis. The second reflective light RL2' passing through the λ/4 phase difference member 650 may be defined as a sub-second reflective light RL2" having a changed polarization component.

In an exemplary embodiment, the ratio of the P-polarization beam P-Pol and the S-polarization beam S-Pol in the second reflective light RL2 may be approximately 6.47%:7.91%. In the sub-second reflective light RL2" having the changed polarization component, the ratio of the P-polarization beam P-Pol and the S-polarization beam S-Pol may be approximately 7.91%:6.47%. In other words, the λ/4 phase difference member 650 may change only the polarization component of the second reflective light RL2, and may not change an intensity or shape of the laser beam (such as the second reflective light RL2). The sub-second reflective light RL2" having the changed polarization component after passing through the λ/4 phase difference member 650 may be incident to the second reflective member 590.

The second reflective member 590 may be disposed in a traveling direction of the sub-second reflective light RL2" having the changed polarization component by passing through the λ/4 phase difference member 650. In an exemplary embodiment, the second reflective member 590 may reflect the sub-second reflective light RL2" having the changed polarization component so that all of the sub-second reflective light RL2" having the changed polarization component and passing through the λ/4 phase difference member 650 are incident to the beam splitter 530.

The beam splitter 530 may allow a portion of the sub-second reflective light RL2", which has the changed polarization component and is reflected from the second reflective member 590, to be transmitted, and may allow a remaining portion of the sub-second reflective light RL2", which has the changed polarization component and is reflected from the second reflective member 590, to be reflected at a predetermined angle. In an exemplary embodiment, the sub-second reflective light RL2" having the changed polarization component and being incident to the beam splitter 530 may be split into a third output light OL3 and a third reflective light RL3 (not shown). In one exemplary embodiment, for example, a portion of the sub-second reflective light RL2" having the changed polarization component may be defined as the third output light OL3 after passing through the beam splitter 530 in the second direction D2, and a remaining portion of the sub-second reflective light RL2" having the changed polarization component may be defined as the third reflective light RL3 after being reflected from the beam splitter 530 in the first direction D1.

After repeating a loop routine in which the third reflective light is incident to the 2I4 phase difference member 650, the first reflective member 570, the λ/4 phase difference member 650, the second reflective member 590 and the beam splitter 530, a plurality of output lights passing through the beam splitter may be generated. An output laser beam OBL may be generated by mixing the first output light OL1, the second output light OL2 and the third output light OL3 with the plurality of output lights. In an exemplary embodiment, the ratio of polarization component of the first output light OL1 (the P-polarization beam P-Pol:the S-polarization beam S-Pol) may be approximately 18.15%:14.85%, the ratio of polarization component of the second output light OL2 may be approximately 19.60%:23.96%, and the ratio of polarization component of the third output light OL3 may be approximately 7.91%:6.47%. In other words, the P-polarization beam P-Pol in the ratio of polarization component of the first output light OL1 may be greater than the S-polarization beam S-Pol, the P-polarization beam P-Pol in the ratio of polarization component of the second output light OL2 may be smaller than the S-polarization beam S-Pol, and the P-polarization beam P-Pol in the ratio of polarization component of the third output light OL3 may be greater than the S-polarization beam S-Pol. In such an embodiment, the ratio of the polarization component of the output laser beam OBL generated by mixing the first output light OL1, the second output light OL2 and the third output light OL3 with the plurality of output lights may be approximately 49.5%:49.5%. In one exemplary embodiment, for example, when the ratio of the polarization component is evenly distributed, grains may grow uniformly upon crystallizing the amorphous silicon layer 130. When the uniformity of the grain is improved, a level of stains, which may be generated during the excimer laser annealing process, may be reduced.

For convenience of illustration and description, FIG. 10 shows that a path of the laser beam is not refracted in each inside of the attenuator 510, the beam splitter 530 and the λ/4 phase difference member 650, but the path of the laser beam may be refracted inside the attenuator 510, the beam splitter 530, or the λ/4 phase difference member 650.

Figure 11:
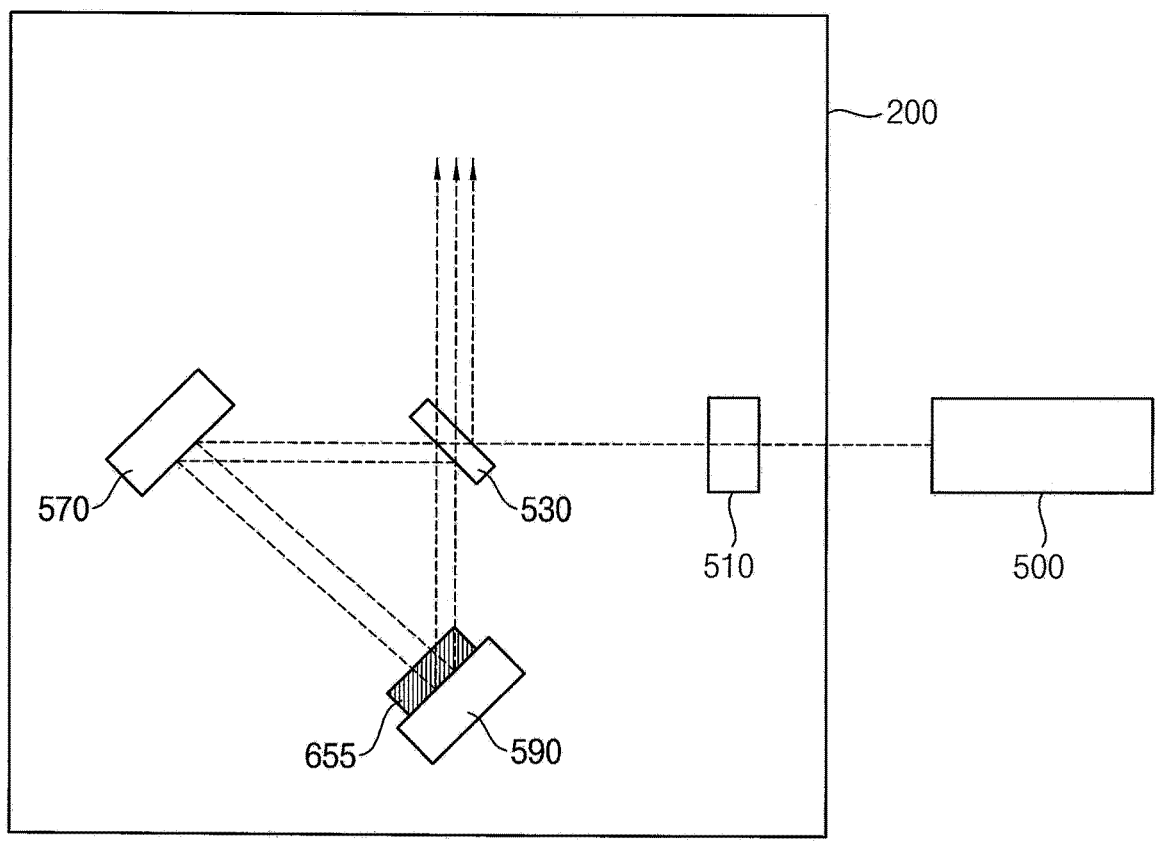
FIG. 11 is a view showing a configuration of an alternative exemplary embodiment of the laser annealing device of FIG. 10.
Figure 11:
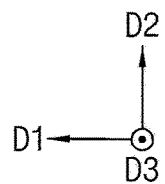

FIG. 11 is a view showing a configuration of an alternative exemplary embodiment of the laser annealing device of FIG. 10. The laser annealing device illustrated in FIG. 11 may have a configuration substantially the same as or similar to that of the laser annealing device 700 described above with reference to FIG. 10, except for a position of the λ/4 phase difference member 655. In FIG. 11, the same or like elements shown in FIG. 10 have been labeled with the same reference characters, and any repetitive detailed description thereof will be omitted.

Referring to FIG. 11, in an exemplary embodiment, the λ/4 phase difference member 655 may be disposed between the beam splitter 530 and the second reflective member 590, and the λ/4 phase difference member 655 may be in direct contact with a front surface of the second reflective member 590. The λ/4 phase difference member 655 may change the polarization component of the transmissive light TL. In an exemplary embodiment, the λ/4 phase difference member 655 may have a fixed angle with respect to the beam splitter 530.

Figure 12:
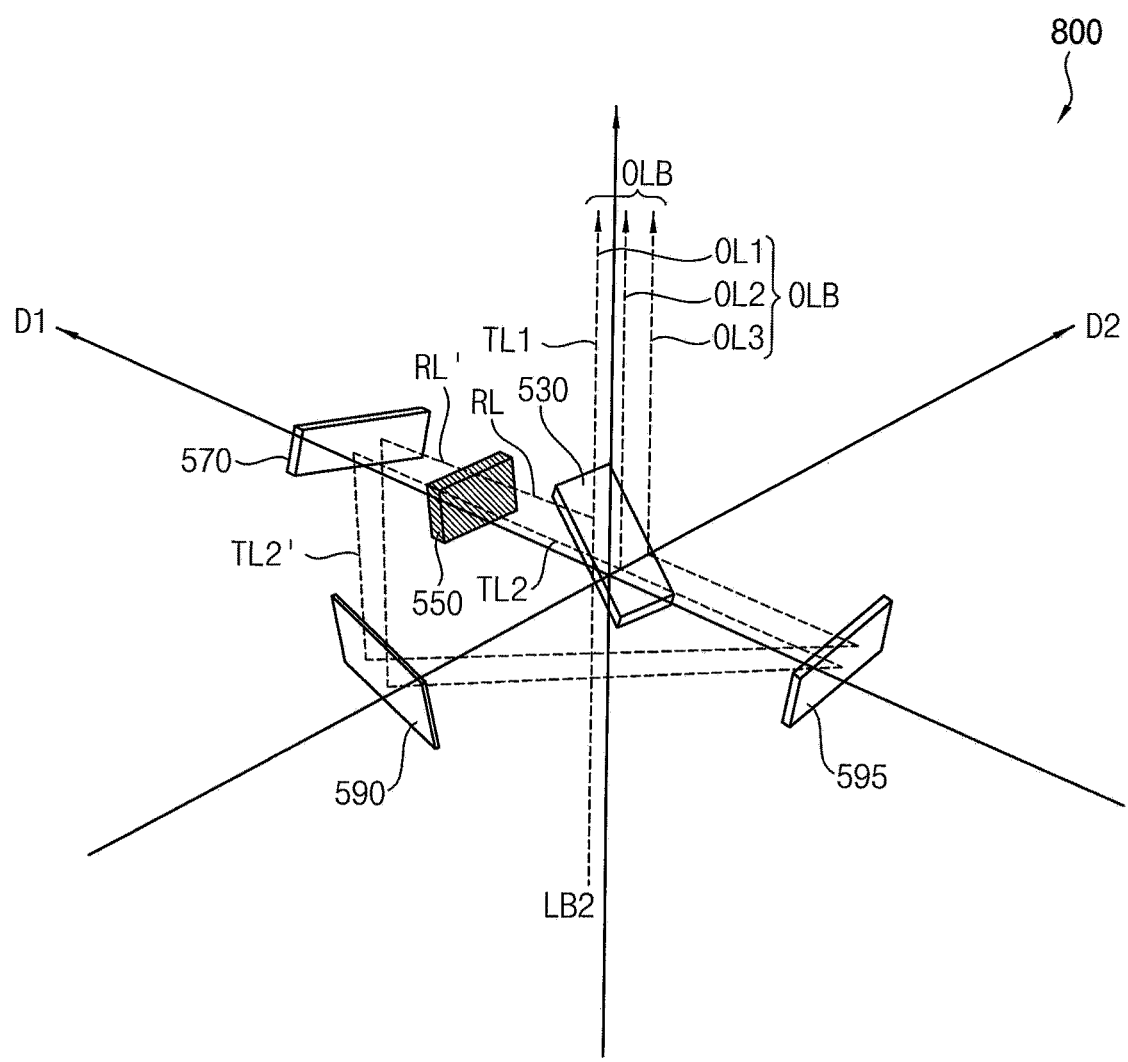
FIG. 12 is a view showing a configuration of a laser annealing device according to an alternative exemplary embodiment of the invention.

FIG. 12 is a view showing a configuration of a laser annealing device according to an alternative exemplary embodiment of the invention. The laser annealing device 800 illustrated in FIG. 12 may have a configuration substantially the same as or similar to that of the laser annealing device 100 described above with reference to FIGS. 1 to 7, except for a third reflective member 595. In FIG. 12, the same or like elements shown in FIGS. 1 to 7 have been labeled with the same reference characters, and any repetitive detailed description thereof will be omitted or simplified.

Referring to FIGS. 1 and 12, in an exemplary embodiment, the laser annealing device 800 may include a laser generator 500, an optical module 200, a stage 300, and the like. The optical module 200 may include an attenuator 510, a beam splitter 530, a 212 phase difference member 550, a first reflective member 570, a second reflective member 590, and a third reflective member 595. In such an embodiment, a substrate 110, e.g., a glass substrate or a plastic substrate, may be disposed on the stage 300, and an amorphous silicon layer 130 may be formed on the substrate 110. The laser annealing device 100 may crystallize the amorphous silicon layer 130 by using an output laser beam OLB outputted through the optical module 200.

In an exemplary embodiment, the beam splitter 530 may be disposed in a traveling direction of the second laser beam LB2. In such an embodiment, the second reflective light RL2 may travel in a third direction D3 perpendicular to the first direction D1 and the second direction D2, and the second laser beam LB2 incident to the beam splitter 530 may be split into a transmissive light TL and a reflective light RL. The first transmissive light TL passed through the beam splitter 530 may travel in the third direction D3, and the first transmissive light TL1 may be defined as the first output light OL1. In such an embodiment, the reflective light RL reflected from the beam splitter 530 may travel in the first direction D1.

In an exemplary embodiment, the λ/2 phase difference member 550 may be disposed in a traveling direction of the reflective light RL. In such an embodiment, the λ/2 phase difference member 550 may be disposed between the beam splitter 530 and the first reflective member 570. The λ/2 phase difference member 550 may change the polarization component of the reflective light RL. In an exemplary embodiment, an optical axis of the λ/2 phase difference member 550 may be approximately 45°. The λ/2 phase difference member 550 may have a fixed angle with respect to the beam splitter 530.

In an exemplary embodiment, the polarization component of the reflective light RL may include an S-polarization beam S-Pol on the horizontal axis and a P-polarization beam P-Pol on the vertical axis. In such an embodiment, when the reflective light RL passes through the λ/2 phase difference member 550, the polarization component of the reflective light RL may be changed into the S-polarization beam S-Pol on the vertical axis and the P-polarization beam P-Pol on the horizontal axis. The reflective light RL passing through the λ/2 phase difference member 550 is defined as a reflective light RL' having a changed polarization component. In an exemplary embodiment, the ratio of the P-polarization beam P-Pol and the S-polarization beam S-Pol in the reflective light RL may be approximately 23.96%:19.60%. In the reflective light RL' having the changed polarization component, the ratio of the P-polarization beam P-Pol and the S-polarization beam S-Pol may be approximately 19.60%:23.96%. Accordingly, in such an embodiment, the λ/2 phase difference member 550 may change only the polarization component of the reflective light RL, and may not change an intensity or shape of the laser beam (such as the reflective light RL). The reflective light RL' having the changed polarization component and passing through the λ/2 phase difference member 550 may travel in the first direction D1.

The first reflective member 570 may be disposed in a traveling direction of the reflective light RL' having the changed polarization component. The first reflective member 570 may reflect all incident beams at a predetermined angle. The first reflective member 570 may have a fixed angle with respect to the λ/2 phase difference member 550. In an exemplary embodiment, all of the reflective light RL' having the changed polarization component and reflected from the first reflective member 570 may be incident to the second reflective member 590. In one exemplary embodiment, for example, after the reflective light RL' having the changed polarization component by passing through the λ/2 phase difference member 550 is reflected from the first reflective member 570, the reflective light RL' having the changed polarization component and reflected from the first reflective member 570 may be incident to the second reflective member 590 without passing through the λ/2 phase difference member 550.

The second reflective member 590 may be disposed in a traveling direction of the reflective light RL' having the changed polarization component and reflected from the first reflective member 570 at a predetermined angle. The second reflective member 590 may reflect all incident beams at a predetermined angle. The second reflective member 590 may have a fixed angle with respect to the first reflective member 570. In an exemplary embodiment, all of the reflective light RL' having the changed polarization component and reflected from the first reflective member 570 may be incident to the third reflective member 595.

The third reflective member 595 may be disposed in a traveling direction of the reflective light RL' having the changed polarization component and reflected from the second reflective member 590 at a predetermined angle. The third reflective member 595 may reflect all incident beams at a predetermined angle. The third reflective member 595 may have a fixed angle with respect to the second reflective member 590. In an exemplary embodiment, the third reflective member 595 may reflect the reflective light RL' having the changed polarization component and reflected from the second reflective member 590 so that all of the reflective light RL' having the changed polarization component and reflected from the second reflective member 590 are incident to the beam splitter 530. The third reflective member 595 may include a same material as the first reflective member 570 and the second reflective member 590.

The beam splitter 530 may allow a portion of the reflective light RL', which has the changed polarization component and is reflected from the third reflective member 595, to be transmitted, and may allow a remaining portion of the reflective light RL', which has the changed polarization component and is reflected from the third reflective member 595, to be reflected at a predetermined angle. In an exemplary embodiment, the reflective light RL' having the changed polarization component and being incident to the beam splitter 530 may be split into a second output light OL2 and a second transmissive light TL2. In one exemplary embodiment, for example, a portion of the reflective light RL' having the changed polarization component may be defined as the second output light OL2 after reflected in the third direction D3 from the beam splitter 530, and a remaining portion of the reflective light RL' having the changed polarization component may be defined as the second transmissive light TL2 after passing through the beam splitter 530 in the first direction D1.

The λ/2 phase difference member 550 may be disposed in a traveling direction of the second transmissive light TL2. In one exemplary embodiment, for example, a moving path of the second transmissive light TL2 may be substantially the same as a moving path of the reflective light RL. The λ/2 phase difference member 550 may change the polarization component of the second transmissive light TL2. In one exemplary embodiment, for example, the polarization component of the second transmissive light TL2 may include an S-polarization beam S-Pol on a vertical axis and a P-polarization beam P-Pol on a horizontal axis. In such an embodiment, when the second transmissive light TL2 passes through the λ/2 phase difference member 550, the polarization component of the second transmissive light TL2 may be changed into a P-polarization beam P-Pol on a vertical axis and an S-polarization beam S-Pol on a horizontal axis (see FIG. 5). The second transmissive light TL2 passing through the λ/2 phase difference member 550 may be defined as a second transmissive light TL2' having a changed polarization component. In an exemplary embodiment, the ratio of the P-polarization beam P-Pol and the S-polarization beam S-Pol in the second transmissive light TL2 may be approximately 6.47%:7.91%. In the second transmissive light TL2' having the changed polarization component, the ratio of the P-polarization beam P-Pol and the S-polarization beam S-Pol may be approximately 7.91%:6.47%. Accordingly, in such an embodiment, the λ/2 phase difference member 550 may change only the polarization component of the second transmissive light TL2, and may not change an intensity or shape of the laser beam (such as the second transmissive light TL2). The second transmissive light TL2' having the changed polarization component and passing through the λ/2 phase difference member 550 may travel in the first direction D1.

The first reflective member 570 may be disposed in a traveling direction of the second transmissive light TL2' having the changed polarization component. In one exemplary embodiment, for example, a moving path of the second transmissive light TL2' having the changed polarization component may be substantially the same as the moving path of the reflective light RL' having the changed polarization component. In an exemplary embodiment, all of the second transmissive light TL2' having the changed polarization component and reflected from the first reflective member 570 may be incident to the second reflective member 590.

The second reflective member 590 may be disposed in a traveling direction of the second transmissive light TL2' having the changed polarization component and reflected from the first reflective member 570 at a predetermined angle. In an exemplary embodiment, all of the second transmissive light TL2' having the changed polarization component and reflected from the first reflective member 570 may be incident to the third reflective member 595.

The third reflective member 595 may be disposed in a traveling direction of the second transmissive light TL2' having the changed polarization component and reflected from the second reflective member 590 at a predetermined angle. In an exemplary embodiment, the third reflective member 595 may reflect the second transmissive light TL2' having the changed polarization component and reflected from the second reflective member 590 so that all of the second transmissive light TL2' having the changed polarization component and reflected from the second reflective member 590 are incident to the beam splitter 530.

The beam splitter 530 may allow a portion of the second transmissive light TL2', which has the changed polarization component and is reflected from the third reflective member 595, to be transmitted, and may allow a remaining portion of the second transmissive light TL2', which has the changed polarization component and is reflected from the second reflective member 590, to be reflected at a predetermined angle. In an exemplary embodiment, the second transmissive light TL2' having the changed polarization component and being incident to the beam splitter 530 may be split into a third output light OL3 and a third reflective light RL3 (not shown). In one exemplary embodiment, for example, a portion of the second transmissive light TL2' having the changed polarization component may be defined as the third output light OL3 after reflected in the third direction D3 from the beam splitter 530, and a remaining portion of the second transmissive light TL2' having the changed polarization component may be defined as the third reflective light RL3 after passing through the beam splitter 530 in the first direction D1.

After repeating a loop routine in which the third reflective light is incident to the 212 phase difference member 550, the first reflective member 570, the second reflective member 590, the third reflective member 595 and the beam splitter 530, a plurality of output lights passing through the beam splitter may be generated. An output laser beam OBL may be generated by mixing the first output light OL1, the second output light OL2 and the third output light OL3 with the plurality of output lights. In an exemplary embodiment, the ratio of polarization component of the first output light OL1 (the P-polarization beam P-Pol:the S-polarization beam S-Pol) may be approximately 18.15%:14.85%, the ratio of polarization component of the second output light OL2 may be approximately 19.60%:23.96%, and the ratio of polarization component of the third output light OL3 may be approximately 7.91%:6.47%. In such an embodiment, the P-polarization beam P-Pol in the ratio of polarization component of the first output light OL1 may be greater than the S-polarization beam S-Pol, the P-polarization beam P-Pol in the ratio of polarization component of the second output light OL2 may be smaller than the S-polarization beam S-Pol, and the P-polarization beam P-Pol in the ratio of polarization component of the third output light OL3 may be greater than the S-polarization beam S-Pol. In such an embodiment, the ratio of the polarization component of the output laser beam OBL generated by mixing the first output light OL1, the second output light OL2 and the third output light OL3 with the plurality of output lights may be approximately 49.5%:49.5%. In one exemplary embodiment, for example, when the ratio of the polarization component is evenly distributed, grains may grow uniformly upon crystallizing the amorphous silicon layer 130. When the uniformity of the grain is improved, a level of stains, which may be generated during the excimer laser annealing process, may be reduced.

For convenience of illustration and description, FIG. 12 shows that a path of the laser beam is not refracted in each inside of the attenuator 510, the beam splitter 530, and the λ/2 phase difference member 550, but the path of the laser beam may be refracted inside the attenuator 510, the beam splitter 530, or the λ/2 phase difference member 550.

Embodiments of the invention may be applied to a method of manufacturing various display devices including a display device manufactured as a laser annealing device. Embodiments of the invention may be applied to a method of manufacturing display devices such as vehicle-display device, a ship-display device, an aircraft-display device, portable communication devices or display devices for display or for information transfer, a medical-display device, for example.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A laser annealing device comprising:
a laser generator which emits a laser beam;
a beam splitter which splits the laser beam into a first reflective light and a transmissive light, wherein a polarization component of the transmissive light includes a P-polarization beam and an S-polarization beam;
a $\lambda/2$ phase difference member which changes a polarization component of the transmissive light from the beam splitter, wherein a relative position of the $\lambda/2$ phase difference member with respect to the beam splitter is fixed in a way such that the $\lambda/2$ phase difference member has a fixed angle with respect to the beam splitter;
a first reflective member which reflects the transmissive light having a changed polarization component by passing through the $\lambda/2$ phase difference member;
a second reflective member which reflects the transmissive light having the changed polarization component in a way such that the transmissive light having the changed polarization component, which is reflected from the first reflective member, is incident to the beam splitter; and
wherein a total output laser beam, which is generated by combining all output light that is directed from the beam splitter to a workpiece, is configured to have substantially equal proportions of P-polarization and S-polarization, and substantial uniformity of beam profile, in order that grains are formed substantially evenly during the laser annealing process.

2. The laser annealing device of claim 1, wherein an optical axis of the $\lambda/2$ phase difference member is about 45°.

3. The laser annealing device of claim 1, wherein
the first reflective light reflected from the beam splitter is defined as a first output light,
the transmissive light having the changed polarization component which passes the beam splitter after reflected from the second reflective member is defined as a second output light, and
the transmissive light having the changed polarization component which is reflected from the beam splitter after reflected from the second reflective member is defined as a second reflective light.

4. The laser annealing device of claim 3, wherein
the polarization component of each of the first output light and the second output light is defined as the P-polarization beam and the S-polarization beam,
a proportion of the P-polarization beam is higher than a proportion of the S-polarization beam in the polarization component of the first output light, and
a proportion of the P-polarization beam is lower than a proportion of the S-polarization beam in the polarization component of the second output light.

5. The laser annealing device of claim 4, wherein a proportion of the P-polarization beam is higher than a proportion of the S-polarization beam in a polarization component of the laser beam emitted from the laser generator.

6. The laser annealing device of claim 4, wherein after a loop routine is repeated in which the second reflective light is incident to the $\lambda/2$ phase difference member, the first reflective member, the second reflective member and the beam splitter, a plurality of output lights passed through the beam splitter are generated, and
an output laser beam is generated by mixing the first and second output lights with the plurality of output lights.

7. The laser annealing device of claim 6, wherein a proportion of P-polarization beam is equal to a proportion of an S-polarization beam in a polarization component of the output laser beam.

8. The laser annealing device of claim 6, wherein
the P-polarization beam is defined in a direction parallel to the output laser beam, and
the S-polarization beam is defined in a direction perpendicular to the output laser beam.

9. The laser annealing device of claim 4, further comprising:
an attenuator disposed between the laser generator and the beam splitter.

10. The laser annealing device of claim 9, wherein a proportion of the S-polarization beam in a polarization component of the laser beam is reduced when the laser beam emitted from the laser generator passes through the attenuator.

11. The laser annealing device of claim 1, wherein
a portion of the transmissive light having the changed polarization component which is reflected from the second reflective member passes through the beam splitter, and
a remaining portion of the transmissive light having the changed polarization component is reflected from the beam splitter.

12. The laser annealing device of claim 1, wherein the beam splitter inverts a pulse shape of the laser beam.

13. The laser annealing device of claim 1, wherein the $\lambda/2$ phase difference member is disposed between the beam splitter and the first reflective member.

14. The laser annealing device of claim 1, wherein
after the transmissive light having the changed polarization component which passes through the $\lambda/2$ phase difference member is reflected from the first reflective member, the transmissive light having the changed polarization component which is reflected from the first reflective member is incident to the second reflective member without passing through the $\lambda/2$ phase difference member.

15. A laser annealing device comprising:
a laser generator which emits a laser beam;
a beam splitter which splits the laser beam into a first reflective light and a transmissive light, wherein a polarization component of the transmissive light includes a P-polarization beam and an S-polarization beam;
a $\lambda/4$ phase difference member which changes a polarization component of the transmissive light from the beam splitter, wherein a relative position of the $\lambda/4$ phase difference member with respect to the beam splitter is fixed in a way such that the $\lambda/4$ phase difference member has a fixed angle with respect to the beam splitter, and the λ/4 phase difference member has an optical axis of about 45°;
a first reflective member disposed in contact with a rear surface of the λ/4 phase difference member to reflect the transmissive light having a changed polarization component by passing through the λ/4 phase difference member;
a second reflective member which reflects the transmissive light having the changed polarization component in a way such that the transmissive light having the changed polarization component is incident to the beam splitter, after the transmissive light having the changed polarization component and reflected from the first reflective member passes through the λ/4 phase difference member; and
wherein a total output laser beam, which is generated by combining all output light that is directed from the beam splitter to a workpiece, is configured to have substantially equal proportions of P-polarization and S-polarization, and substantial uniformity of beam profile, in order that grains are formed substantially evenly during the laser annealing process.

16. The laser annealing device of claim 15, wherein
the first reflective light reflected from the beam splitter is defined as a first output light,
the transmissive light having the changed polarization component which passes the beam splitter after reflected from the second reflective member is defined as a second output light, and
the transmissive light having the changed polarization component which is reflected from the beam splitter after reflected from the second reflective member is defined as a second reflective light.

17. The laser annealing device of claim 16, wherein
the polarization component of each of the first output light and the second output light is defined as the P-polarization beam and the S-polarization beam,
a proportion of the P-polarization beam is higher than a proportion of the S-polarization beam in a polarization component of the first output light, and
a proportion of the P-polarization beam is lower than a proportion of the S-polarization beam in a polarization component of the second output light.

18. The laser annealing device of claim 17, wherein a proportion of the P-polarization beam is higher than a proportion of the S-polarization beam in a polarization component of the laser beam emitted from the laser generator.

19. The laser annealing device of claim 16, wherein
after a loop routine is repeated in which the second reflective light is incident to the λ/4 phase difference member, the first reflective member, the λ/4 phase difference member, the second reflective member and the beam splitter, a plurality of output lights passing through the beam splitter are generated, and
an output laser beam is generated by mixing the first and second output lights with the plurality of output lights.

20. The laser annealing device of claim 15, wherein
the transmissive light having the changed polarization component which passes through the λ/4 phase difference member is reflected from the first reflective member, and
the transmissive light having the changed polarization component which is reflected from the first reflective member passes through the λ/4 phase difference member and then is incident to the second reflective member.

* * * * *